J. L. LA DRIERE.
SPRING AND CUSHIONING MEANS FOR VEHICLES.
APPLICATION FILED FEB. 24, 1913.
1,072,241.  Patented Sept. 2, 1913.
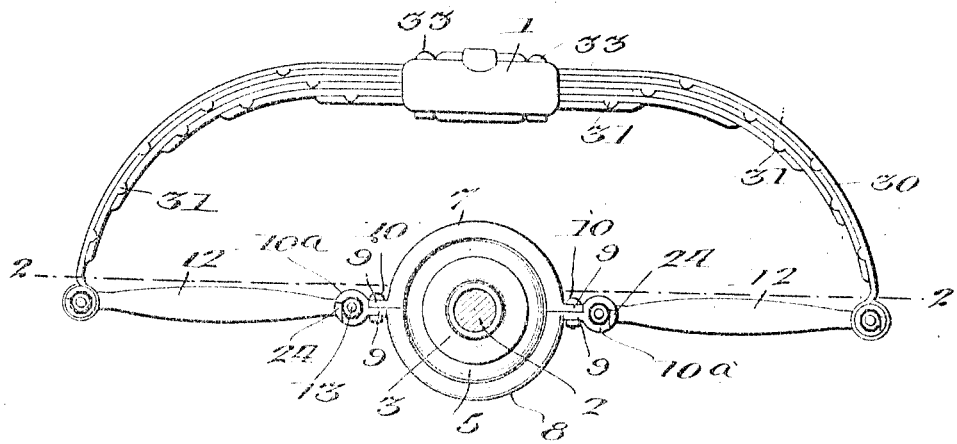
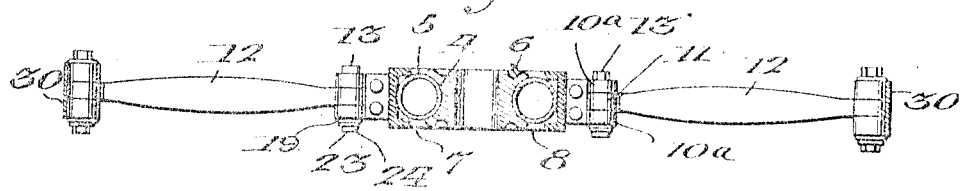
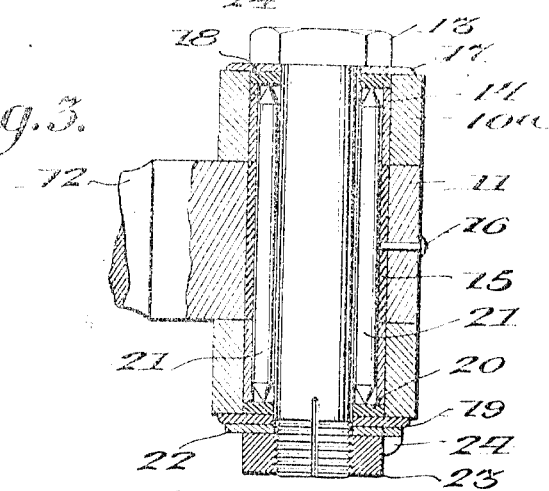
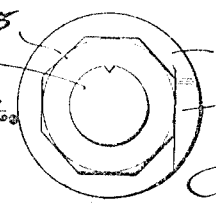
WITNESSES
Philip E. Barnes
E. J. Sheely
INVENTOR
J. L. La Driere
by James Sheely & Co.
Attorneys

UNITED STATES PATENT OFFICE.

JOSEPH L. LA DRIERE, OF ALBUQUERQUE, NEW MEXICO.

SPRING AND CUSHIONING MEANS FOR VEHICLES.

1,072,241.  Specification of Letters Patent.  Patented Sept. 2, 1913.

Application filed February 24, 1913. Serial No. 750,409.

*To all whom it may concern:*

Be it known that I, JOSEPH L. LA DRIERE, citizen of the United States, residing at Albuquerque, in the county of Bernalillo and State of New Mexico, have invented new and useful Improvements in Spring and Cushioning Means for Vehicles, of which the following is a specification.

My present invention pertains to springs or cushioning means for vehicles; and it contemplates the provision of simple, compact and highly efficient means for absorbing shocks and jars and preventing the transmission of the same from an axle to a vehicle body, and this while adequately cushioning the body.

To the attainment of the foregoing the invention consists in the peculiar construction, novel combination and adaptation of parts hereinafter described and definitely claimed.

In the accompanying drawings which are hereby made a part hereof: Figure 1 is a view showing my novel spring and cushioning and shock absorbing means in side elevation. Fig. 2 is a view partly in section, and partly in plan of the same. Fig. 3 is an enlarged detail view illustrative of one of the knuckle joints comprised in my novel device. Fig. 4 is a view showing the lock I prefer to employ for securing a nut on each of the bolts comprised in the knuckle joints.

Similar numerals of reference designate corresponding parts in all of the views of the drawings.

My novel device is interposed between a vehicle body 1 and an axle 2, the latter being designed to carry ground wheels (not illustrated).

In furtherance of my invention, I surround the axle with a box 3 having a circumferential groove 4, and in said groove I seat an annular, inflatable cushioning tube 5; the said tube having an inflation tube 6, of conventional or other suitable construction, through which it may be charged with air under pressure. I would have it understood, however, that without involving departure from the scope of my claimed invention, an annular cushion other than a pneumatic tube may be employed. Around the annular cushion 5 I arrange a casing that is preferably of metal, and is preferably formed in sections 7 and 8, having opposed lugs 9, connected by bolts 10. The lugs 9 of the casing section 8 are provided with spaced tubular portions 10ª, Fig. 2, and between the tubular portions 10ª of each pair is arranged the tubular portion 11 at the inner end of one vertically swinging arm 12. Thus it will be manifest that the arms 12 of which two are employed, are connected with the casing by knuckle joints. These knuckle joints are identical in construction, and therefore a detailed description of the one shown in Fig. 3 will suffice to impart a definite understanding of both. By reference to Fig. 3 it will be seen that in addition to the tubular portions 10ª and 11, each knuckle joint comprises a threaded and grooved bolt 13, linings 14 arranged in the tubular portions 10ª, a lining 15 arranged in the tubular portion 11 and secured by a removable screw 16, a washer 17 arranged against the bolt head and the adjacent tubular portion 10ª, a case-hardened washer 18 arranged at the inner side of the washer 17, and within one tubular portion 10ª, a washer 19 arranged at the opposite end of the joint, with reference to the washer 17, a case-hardened washer 20 arranged at the inner side of said washer 19, a circular series of case-hardened anti-friction rollers 21 interposed between the bolt shank and the linings and having tapered ends which bear at their apices against the washers 18 and 20, a washer 22 surrounding the bolt and arranged against the washer 19, and a nut 23 mounted on the bolt, at the outer side of the washer 22. By virtue of this construction of knuckle joint, it will be manifest that each arm 12 is strongly connected with the annular casing in such manner that the arm is enabled to freely swing in a vertical plane; also, that the vertical swinging movements of the arm will be practically free from friction between the arm and the casing. In the present and preferred embodiment of my invention, the washer 22 in each knuckle joint is provided with a tongue to take into the groove in the bolt shank, and is also provided with a spring projection 24, designed to rest at the side of the nut 23 with a view to locking the said nut to the bolt shank.

Arranged above and in the same vertical plane as the arms 12, is a leaf spring 30, the ends of which are connected pivotally with the outer ends of the arms 12, preferably, though not necessarily, through the medium of knuckle joints such as shown in Fig. 3.

The leaves of the spring are preferably provided with side lips 31 to keep them in alinement with each other. The upper and intermediate portion of the spring is connected with the body 1 through the medium of bolts 33 or any other means compatible with the purpose of my invention.

As will be observed by reference to Fig. 2, the upper section 7 of the annular casing is interiorly square, this in order to enable the annular cushion to expand and be highly resilient.

In the practical use of my invention, the weight imposed on the upper intermediate portion of the spring 30 bends inwardly both ends of the spring to a slight extent, and in a recoil the casing will move downwardly below the horizontal center, and will bend the spring in the same manner either by bearing down or pulling up on the spring. From this it follows that my improved device is calculated to serve as a shock absorber as well as a cushioning means. It will also be observed in the foregoing connection that the shaft or axle, the annular cushion and the casing surrounding said cushion can move upwardly and downwardly to a great extent with but little bending of the spring, which is materially advantageous because it materially prolongs the usefulness of the spring.

Having described my invention, what I claim and desire to secure by Letters-Patent, is:

1. In means for the purpose described, the combination of a vehicle shaft or axle, a body disposed above the same, a cushioning annulus surrounding the shaft or axle, a casing surrounding said annulus, a spring having its intermediate portion connected with the body, and vertically-swinging arms pivotally connected at their inner ends with the casing and connected at their outer ends with the end portions of the spring.

2. In means for the purpose described, the combination of a vehicle shaft or axle, a body disposed above the same, a cushioning annulus surrounding the shaft or axle, a casing surrounding said annulus, a spring having its intermediate portion connected with the body, vertically swinging arms connected at their outer ends with the end portions of the springs, and knuckle joints interposed between and connecting the casing and the inner ends of said arms and respectively comprising tubular portions, a bolt extending therethrough, and anti-friction rollers interposed between the tubular portions and the bolt.

3. In means for the purpose described, the combination of a vehicle shaft or axle, a body disposed above the same, a cushioning annulus surrounding the shaft or axle, a casing surrounding said annulus, a spring having its intermediate portion connected with the body, vertically swinging arms connected at their inner ends with the casing, and knuckle joints interposed between and connecting the end portions of the spring and the outer ends of said arms and respectively comprising tubular portions, a bolt extending therethrough, and anti-friction rollers interposed between the tubular portions and the bolt.

4. In means for the purpose described, the combination of a vehicle shaft or axle, a body disposed above the same, a cushioning annulus, of circular form in cross-section, surrounding the shaft or axle, a casing surrounding said annulus and having a lower portion that seats the annulus and an upper portion having a square interior presented to the annulus, a spring having its intermediate portion connected with the body, and vertically swinging arms interposed between and connecting the casing and the end portions of the spring.

In testimony whereof I have hereunto set my hand in presence of two subscribing witnesses.

JOSEPH L. LA DRIERE.

Witnesses:
 Louis Black,
 Julia R. Wilcox.